Patented June 7, 1949

2,472,471

UNITED STATES PATENT OFFICE 2,472,471

PROCESS FOR THE PREPARATION OF THIOETHERS

Lawrence T. Eby, Roselle, N. J., assignor to Standard Oil Development Company, a corporation of Delaware No Drawing. Application August 4, 1945, Serial No. 609,041

9 Claims. (Cl. 260—609)

1

This invention relates to a method of preparing thioethers by the reaction of a mercaptan with an organic halide in the presence of a Friedel-Crafts type catalyst.

It is an object of this invention to provide the art with an improved method of reacting a mercaptan with an organic halide in that the reaction is catalyzed by a Friedel-Crafts type of catalyst.

It is another object of this invention to catalyze the reaction between a mercaptan and an organic halide with a true catalyst.

It is another and further object of this invention to prepare thioethers by an efficient and economical method.

These and other objects appear more clearly from the detailed description and claims which follow.

Heretofore thioethers have been made from the reaction of a mercaptan with an organic halide by the use of an alkaline reagent. This base is not a true catalyst because stoichiometric quantities of the base are required for the completion of the reaction; furthermore, the base is here a reagent which reacts with the mercaptan to form a mercaptide, a salt of the mercaptan. The mercaptide reacts with the organic halide to yield the thioether. There has been a large consumption of caustic in the production of thioethers by the methods practiced heretofore.

It has now been discovered that thioethers can be prepared by reacting a mercaptan with an organic halide in the presence of a catalyst selected from the class known in the art as Friedel-Crafts type catalysts such as $BF_3$, $HF$, $SnCl_4$, $AlCl_3$, $TiCl_4$, $FeCl_3$, etc.

The following equation probably represents the reaction taking place between a mercaptan and an organic halide:

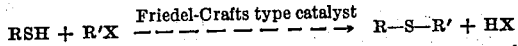

$$RSH + R'X \xrightarrow{\text{Friedel-Crafts type catalyst}} R\text{—}S\text{—}R' + HX$$

In the foregoing equation R and R' are organic groups such as alkyl, aryl, alkaryl and aralkyl and X is a halogen.

The following examples illustrate some applications of the invention but it is not intended that the invention be restricted by or to the examples.

Example 1

Two cc. of anhydrous $SnCl_4$ were added to a stirred solution of 37.1 g. of tertiary-octyl chloride, prepared from diisobutylene and HCl and 26 g. amyl mercaptan. The reaction mixture was stirred until evolution of HCl had ceased and then hydrolyzed by adding dilute $Na_2CO_3$ solution.

2

When agitation was stopped, there was a separation into two layers and the organic layer was separated, washed with water, dried over anhydrous $K_2CO_3$ and fractionally distilled. Amyl tertiary-octyl sulfide was obtained from the distillation.

Example 2

47.3 grams of tertiary butyl chloride were added dropwise over a period of 10 minutes to a mixture of 58.8 grams of amyl mercaptan and 8.1 grams of anhydrous ferric chloride in a 1-liter flask equipped with a stirrer, reflux condenser and dropping funnel. After the tertiary butyl chloride had all been added, the reaction mixture was stirred at room temperature for 1½ hours and then warmed on a water bath and held at 40 to 70° C. for an additional hour. The reaction mixture was poured into a hydrochloric acid solution composed of 150 cc. of concentrated hydrochloric acid and 500 cc. of water. The mixture separated into two layers and the organic layer was separated, washed with water and sodium carbonate solution and dried over anhydrous potassium carbonate; it was then fractionally distilled to obtain amyl tertiary butyl sulfide.

Example 3

58.9 grams of amyl mercaptan were added dropwise over a period of 30 minutes to a premixed solution of 46.5 grams of secondary butyl chloride and 13 grams of anhydrous stannic chloride in a 1-liter flask equipped with a stirrer, return condenser and dropping funnel. The temperature of the reaction mixture during the addition was 30 to 38° C., after the addition the reaction mixture was stirred for one-half hour at 30° C. and then poured into dilute aqueous hydrochloric acid which was extracted with ether followed by a washing of the ether layer with dilute sodium bicarbonate solution. The ether solution was dried over anhydrous potassium carbonate and fractionally distilled to obtain amyl secondary butyl sulfide.

Example 4

58.8 grams of amyl mercaptan were added dropwise over a period of 15 minutes to a vigorously stirred suspension of 12 grams of aluminum chloride and 46.9 grams of secondary butyl chloride contained in a 1-liter flask equipped with a stirrer, reflux condenser and dropping funnel. After the addition of the mercaptan, the reaction mixture was heated and stirred for 20 minutes at a temperature of 40 to 50° C. and then poured onto ice and dilute aqueous hydrochloric acid, followed by extraction of the ether. The ether solution was dried over anhydrous potassium carbonate and fractionated to obtain amyl secondary butyl sulfide.

*Example 5*

Four liters of boron trifluoride were bubbled into a mixture of 46.7 grams of secondary butyl chloride and 59.3 grams of amyl mercaptan in a 1-liter flask equipped with a stirrer, return condenser and dropping funnel over a period of 1½ hours, during which time the reaction mixture was maintained at a temperature between 25 and 50° C. The reaction mixture was washed with dilute aqueous sodium bicarbonate solution, dried over anhydrous potassium carbonate and fractionally distilled to recover amyl secondary butyl sulfide.

*Example 6*

34 grams of anhydrous aluminum chloride were added in small portions over a period of 15 minutes to a mixture of 73.8 grams of tertiary octyl mercaptan and 64.2 grams of benzyl chloride in a 1-liter flask equipped with a stirrer and return condenser. The mixture was stirred, after the addition was complete, at room temperature for 40 minutes and then poured onto ice and dilute aqueous hydrochloric acid, followed by extraction with ether. The ether extract was washed with water, dried over anhydrous potassium carbonate and fractionally distilled to obtain benzyl tertiary octyl sulfide.

The temperature at which the reaction is made depends upon the mercaptan and halide used, as well as upon the catalyst chosen and may vary from −20° to 200° C. The pressure at which the reaction is made also depends upon the mercaptan and halide used and may vary from atmospheric to several atmospheres.

A large number of halides not included in the examples set out above may be employed in this invention. The halides and mercaptans can both be of the alkyl, aryl, aralkyl or alkaryl types and the alkyl and aralkyl types may be primary, secondary or tertiary. Other substituents may be present in either the mercaptan or halide providing they are not affected by the catalyst.

Some examples of mercaptans and halides which may be employed in this invention are listed below but the scope of the invention is not intended to be limited thereby: benzyl chloride, parachlorbenzyl chloride, paranitrobenzyl chloride, brombenzene, iodobenzene, tertiarybutyl chloride, isopropyl chloride, butyl chloride, amyl chloride, octyl chloride, dodecyl chloride, dodecyl bromide, benzyl mercaptan, parachlorbenzyl mercaptan, paranitrobenzyl mercaptan, phenyl mercaptan, paranitrophenyl mercaptan, tertiarybutyl mercaptan, isopropyl mercaptan, butyl mercaptan, amyl mercaptan, octyl mercaptan and dodecyl mercaptan.

The thioethers have a variety of uses such as their use as solvents, plasticizers, corrosion inhibitors, cutting oils as such or in combination with other mineral oils and as lube oil additives after sulfurization by treatment with sulfur, sulfur chlorides, etc.

The thioethers described can be made according to the invention by a continuous process by continuously withdrawing part of the reaction mixture from the reaction vessel and at the same time continuously adding reactants to the reaction vessel. The thioether is isolated from the reaction mixture as it is withdrawn by distillation or extraction with a suitable solvent such as an ether followed by distillation.

What is claimed is:

1. A process of making thioether compounds having the general formula R—S—R′, wherein R and R′ represent hydrocarbon groups containing an alkyl radical, which comprises reacting a mercaptan of the formula RSH with an organic halide of the formula R′X, X representing a halogen atom, in the presence of a Friedel-Crafts type catalyst at a temperature within the range of −20° C. and 200° C.

2. A process according to claim 1 in which the catalyst is $BF_3$.

3. A process according to claim 1 in which the catalyst is HF.

4. A process according to claim 1 in which the catalyst is $SnCl_4$.

5. A process according to claim 1 in which a tertiary carbon atom in the hydrocarbon R group of the mercaptan is bonded to the —SH group and a primary carbon atom in the hydrocarbon R′ group of the organic halide is bonded to the halogen atom X.

6. A process according to claim 1 in which a primary carbon atom in the hydrocarbon R group of the mercaptan is bonded to the SH group and a tertiary carbon atom in the hydrocarbon R′ group of the organic halide is bonded to the halogen atom X.

7. A process for making a thioether which comprises reacting an alkyl mercaptan with an alkyl chloride in the presence of a Friedel-Crafts type catalyst at a temperature within the range of −20° C. and 200° C.

8. A process for making a thioether which comprises reacting an alkyl mercaptan with benzyl chloride in the presence of a Friedel-Crafts type catalyst at a temperature within the range of −20° C. and 200° C.

9. A process for making thioether compounds having the general formula R—S—R′, wherein R represents a hydrocarbon group containing an alkyl radical and R′ represents a hydrocarbon group selected from the group consisting of alkyl radicals and aralkyl radicals, which comprises reacting a mercaptan of the formula RSH with an organic halide of the formula R′X, X representing a halogen atom, in the presence of a Friedel-Crafts type catalyst at a temperature within the range of −20° C. and 200° C.

LAWRENCE T. EBY.

REFERENCES CITED

The following references are of record in the file of this patent:

UNITED STATES PATENTS

| Number | Name | Date |
| --- | --- | --- |
| 2,065,323 | Thomas | Dec. 22, 1936 |
| 2,181,642 | McMillan | Nov. 28, 1939 |
| 2,366,453 | Meadow | Jan. 2, 1945 |
| 2,368,446 | Buc | Jan. 30, 1945 |
| 2,389,153 | Kendall | Nov. 20, 1945 |

FOREIGN PATENTS

| Number | Country | Date |
| --- | --- | --- |
| 202,632 | Germany | Oct. 8, 1908 |

OTHER REFERENCES

Arndt "Berichte", Vol. 63, pages 2390–2393.